April 11, 1967 H. KRATOCHVIL 3,313,981

SEQUENTIAL FLASHER

Filed May 27, 1964

INVENTOR
HARRY KRATOCHVIL
BY
Eyre, Mann & Lucas
ATTORNEYS

United States Patent Office 3,313,981
Patented Apr. 11, 1967

3,313,981
SEQUENTIAL FLASHER

Harry Kratochvil, Fords, N.J., assignor, by mesne assignments, to Tung-Sol Industries, Inc., Newark, N.J., a corporation of Delaware Filed May 27, 1964, Ser. No. 370,551
6 Claims. (Cl. 315—210)

The present invention relates to flashing lamps on and off sequentially as is done in some motor vehicles for giving warnings and indicating turns and provides electronic circuits for this purpose. Basically, the electronic circuits each comprise an electronic switching means which switches back and forth between two operating states at a fixed repetition rate and a control circuit that responds to the switching of the electronic switching means by lighting and extinguishing the lamps in sequence.

These electronic circuits have no moving parts, are relatively insensitive to variations in the supply potential, have a long life, and will continue to function when one or more of the lamps fail.

In the preferred embodiments of the invention, hereafter to be described, each lamp load to be flashed is coupled to a switching transistor of an astable multivibrator through a separate lag circuit of different time constant, the longest time constant of which does not exceed the period of dwell of the switching transistor in one of its operating conditions. With this arrangement the lamp loads may be sequentially energized and then simultaneously deenergized at the frequency of oscillation of the multivibrator.

For a better understanding of the present invention and for other advantages thereof reference should be had to the accompanying drawing of which;

Figure 1:
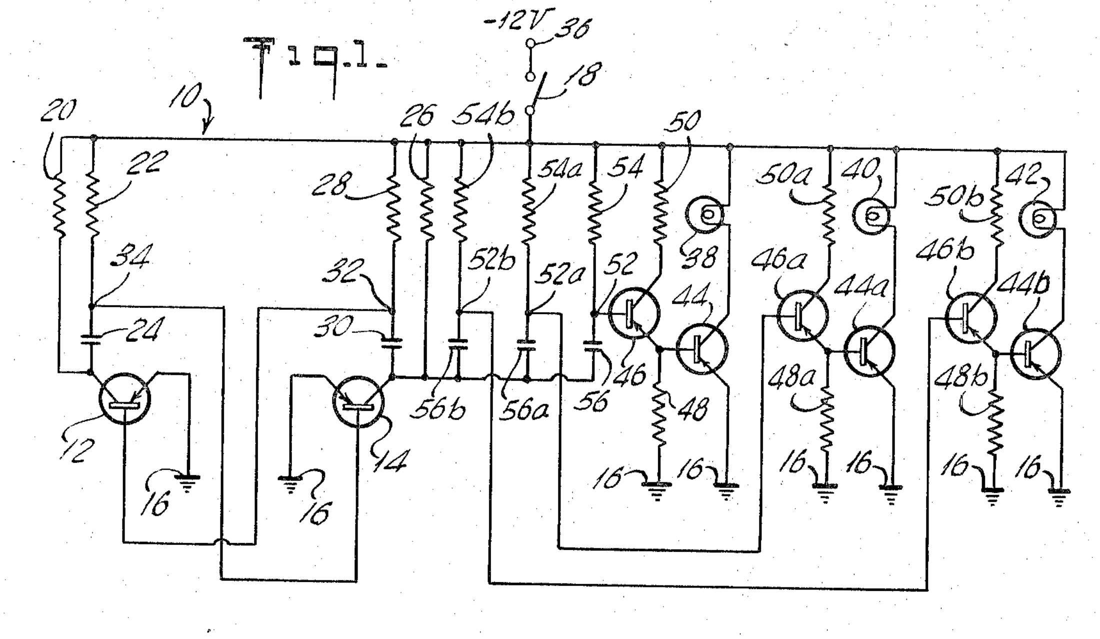
FIGURE 1 is a schematic diagram of one embodiment of the present invention.

In the embodiment of FIGURE 1, the electronic switching means mentioned above is an astable multivibrator 10 which includes two PNP transistors 12 and 14. The emitter of each of the two transistors is connected to the positive or grounded terminal 16 of a 12 volt D.C. source, such as an automobile battery. The collector of transistor 12 is connected to the movable arm of a switch 18 through a resistor 20 and also through a resistor 22 and capacitor 24 connected in series. The collector of the transistor 14 is also connected to the movable arm of switch 18 through a resistor 26 and through a resistor 28 and capacitor 30 connected in series. The base of the transistor 12 is connected to the point 32 common to both resistor 28 and capacitor 30 and the base of the transistor 14 is connected to the point 34 common to both resistor 22 and capacitor 24.

The normally open terminal of switch 18 is connected to the ungrounded negative terminal 36 of the 12 volt D.C. supply, and when the switch is closed, the full 12 volts of the D.C. supply is applied across the astable multivibrator 10 causing it to oscillate, alternately rendering the transistors 12 and 14 conductive and nonconductive.

When the second transistor 14 is conducting, the collector thereof is held substantially at ground potential by current flow through the transistor 14. For reasons which will be more apparent later, with the collector of the second multivibrator transistor 14 at ground potential, the potential at point 32 is positive with respect to ground, biasing the base of the first multivibrator transistor 12 positive with respect to the emitter thereby rendering the first transistor 12 nonconductive.

While the second multivibrator transistor 14 conducts, capacitor 24 is connected across the 12 volt D.C. supply in series with resistor 20 and the base to emitter path of the second multivibrator transistor 14 so that current flows through resistor 20 and charges capacitor 24 negatively with respect to point 34. In addition, while the second multivibrator transistor 14 conducts, capacitor 30 is connected across the 12 volt D.C. supply in a series circuit with the resistor 28 and the emitter to collector path through the second multivibrator transistor 14. The current flow through this series circuit eventually makes point 32 slightly negative with respect to ground causing the first multivibrator transistor 12 to conduct. When the first multivibrator transistor 12 conducts, its collector is brought to ground potential. As a result of this, the charge which accumulated on capacitor 24 while the second transistor was conducting makes point 34 positive with respect to ground potential thereby biasing the base of the second multivibrator transistor 14 positive with respect to the emitter of the second multivibrator transistor and rendering the second multivibrator transistor 14 nonconductive.

Therefore, the first multivibrator transistor 12 is now conductive and the second transistor 14 is nonconductive. With the first multivibrator transistor 12 conducting, capacitor 30 is connected across the 12 volt D.C. supply in series with resistor 26 and the base to emitter path of the first multivibrator transistor 12 so that current flows through resistor 26 and charges capacitor 30 negatively with respect to point 32. In addition, while the first multivibrator transistor 12 conducts, capacitor 24 is connected across the 12 volt D.C. supply in series with resistor 22 and the emitter to collector path of the first multivibrator transistor 12. The current flow through this series circuit first discharges the capacitor 24 to reduce the positive potential at point 34 to zero and then charges the capacitor 24 to make point 34 slightly negative with respect to ground. When this occurs, the base of second multivibrator transistor 14 is biased negative with respect to ground and the second multivibrator transistor 14 conducts. With conduction of the second multivibrator 14, its collector is brought to ground potential, and as a result of this, point 32 is made positive with respect to ground because of the charge on capacitor 30. This renders the first multivibrator transistor 12 nonconductive.

Therefore, the second multivibrator transistor 14 is conductive and the first multivibrator transistor 12 is nonconductive, completing one full oscillation cycle of the astable multivibrator 10. This cycle is repeated over and over again so long as the switch 18 remains closed. When the switch 18 is opened, of course, the oscillations come to a halt.

In accordance with the present invention, the repeated switching of the second transistor 14 conductive and nonconductive is employed to light and extinguish a number of lamps 38, 40 and 42 in sequence in repeated cycles. The filament of the first lamp 38 is connected between the arm of the switch 18 and the collector of a PNP transistor 44. The emitter of the transistor 44 is connected to ground and the base of transistor 44 is connected to the emitter of a second transistor 46 and to a resistor 48 which is connected at the opposite end thereof to the grounded terminal 16 of the 12 volt D.C. power supply. The collector of transistor 46 is connected through a resistor 50 to the arm of the switch 18, and the base of transistor 46 is connected to the common point 52 of a resistor 54 and a capacitor 56 connected in series across resistor 26.

When transistor 14 is conducting, capacitor 56 is charged by the 12 volt D.C. supply through resistor 54, making the potential at point 52 negative with respect to ground. Eventually, the potential at point 52 becomes sufficiently negative to make the base of transistor 46 negative with respect to the emitter of transistor 46 thus rendering transistor 46 conductive. With this, current flows through resistor 48 biasing transistor 44 conductive and thereby energizing the first lamp 38 so that it lights.

As explained previously, transistor 14 is eventually rendered nonconductive by the cycling of the multivibrator 10. When this happens, the capacitor 56 is connected in a series circuit with resistor 26, the transistor 46 and the resistor 48 across the 12 volt D.C. supply so that the capacitor 56 starts charging negatively with respect to point 52 making the collector of transistor 14 more and more negative with respect to point 52.

All this time the light 38 remains lit because the base of the transistor 46 is still negative with respect to the emitter of the transistor 46. However, when transistor 14 is again driven conductive, the collector thereof is placed at ground potential, and the voltage at point 52 is raised above ground potential, as a result of the charging of the capacitor 56 through resistor 26. This biases the base of the transistor 46 positive with respect to its emitter, thus rendering it nonconductive and as a result, extinguishing the lamp 38.

With transistor 46 nonconductive, point 52 is floating and the capacitor 56 first starts discharging through resistor 54 towards ground potential and then starts charging through resistor 54 towards minus 12 volts to repeat the cycle. Therefore, the light 38 is repeatedly lit and extinguished as a result of the switching of the second multivibrator transistor 14 conductive and nonconductive by the cycling of the multivibrator 10.

The second and third lamps 40 and 42 are connected in actuating circuits identical with the one described with respect to lamp 38 except for the fact that the time constant of the resistor 54*a* and capacitor 56*a* is larger than the time constant of the resistor 54 and 56, and the time constant of the resistor 54*b* and the capacitor 56*b* is even larger. Therefore, the lamps 38, 40 and 42 go on in sequence, first lamp 38, then lamp 40 and finally lamp 42. All the lamps then extinguish simultaneously when the second multivibrator transistor 14 is rendered conductive after having first been rendered nonconductive as described above.

Figure 2:
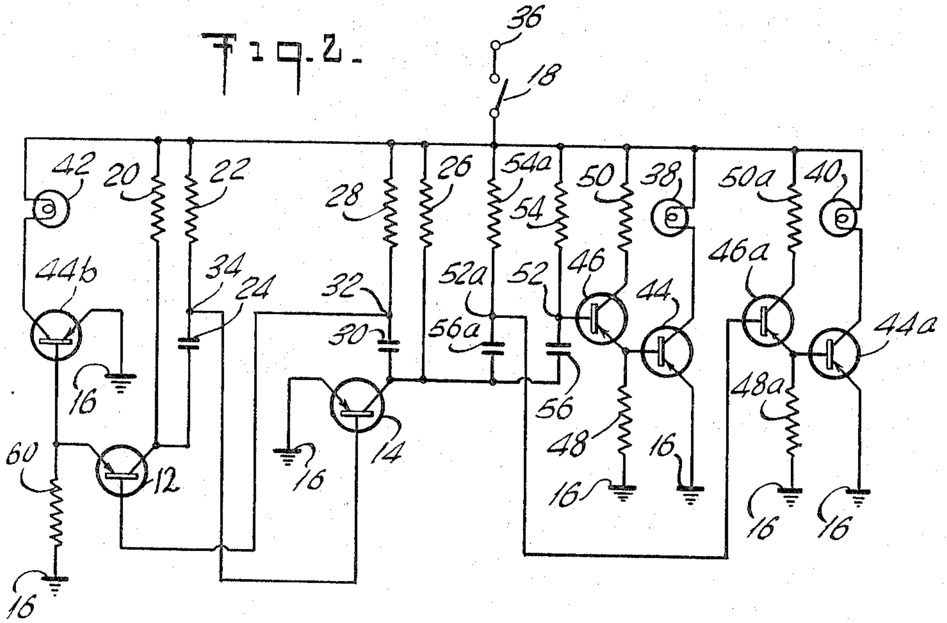
FIGURE 2 is a schematic diagram of another embodiment of the present invention.

The circuit of FIG. 2 differs from the circuit of FIG. 1 in that the emitter of the first multivibrator transistor 12 is connected through a resistor 60 to ground instead of being connected directly to ground and the base of the transistor 44*b* for the lamp control circuit of the third lamp 42 is connected to the emitter of the first multivibrator transistor 12 instead of to the emitter of transistor 46*b*. This eliminates the necessity for transistor 46*b* and also for resistors 50*b* and 54*b* and capacitor 56*b*. Therefore, the circuit of FIG. 2 is simpler than the circuit of FIG. 1.

In operation, the circuit of FIG. 2 is quite similar to the operation of the circuit illustrated in FIG. 1. When the second multivibrator transistor 14 is conducting the capacitor 56 charges and drives point 52 negative with respect to the emitter of transistor 46, thereby lighting the first lamp 38. Thereafter, capacitor 56*a* charges sufficiently to drive the base of transistor 46*a* negative with respect to the emitter of the transistor 46*a* thereby lighting the second lamp 40 after the first lamp 38 has been lit. Thereafter, when the first multivibrator transistor 12 is rendered conductive and the second multivibrator transistor 14 is rendered non-conductive, as described above, current flows through the resistor 60 connected in series between the emitter of the first multivibrator transistor 12 and ground. This biases the base of transistor 44*b* negative with respect to the emitter of transistor 44*b* thus lighting the third lamp 42 after the first and second lamps 38 and 40 have been lit so that the lamps 38, 40 and 42 are all then lit. When the second multivibrator transistor 14 is rendered conductive again and the first multivibrator transistor 12 is thereby rendered non-conductive, the lamps 38 and 40 are extinguished as a result of points 52 and 52*a* being driven positive when the second oscillator transistor 14 conducts and the lamp 42 is extinguished as a result of the emitter of the first multivibrator transistor 12 being placed at ground potential when the first multivibrator transistor 12 is rendered nonconductive so that all the lamps 38, 40 and 42 are extinguished simultaneously.

Above, two embodiments of the present invention have been described. Obviously, modifications of these embodiments will be apparent to those skilled in the art. Therefore, the present invention is not limited to the disclosed embodiments, but covers all changes and modifications thereof which are within the spirit and scope of the appended claims.

I claim:

1. An electronic circuit which will sequentially energize a plurality of loads and which comprises:
   (a) a three terminal semiconductor switching means which can be switched into either of two operating states by the proper biasing of one of the terminals with respect to one of the other two terminals;
   (b) means for supplying the proper biasing to switch the three terminal semiconductor switching means in repetitive cycles between the two operating states;
   (c) a separate lag circuit means coupled between one terminal of said semiconductor switching means and each load for energizing said loads in response to the switching of the switching means into one of its operating states, the time constants of said lag circuit means being different to cause sequential energization of the loads; and
   (d) circuit means for maintaining all loads energized after said switching means has been switched to the other of its operating states, said circuit means operative to simultaneously deenergize all loads when the switching device is switched back into said one of its operating states.

2. The electronic circuit of claim 1 including an astable multivibrator which has as one of its active elements the three terminal semiconductor switching means and includes the means for supplying the proper biasing to the three terminal semiconductor switching means.

3. An electronic circuit which will sequentially flash a plurality of lamp loads and which comprises:
   (a) a source of D.C. potential;
   (b) a first resistor;
   (c) a three terminal semiconductor switching means with two of said terminals connected in series with said first resistor across said source of D.C. potential and which can be switched into either of two operating states by proper biasing of the third terminal with respect to one of the other two terminals;
   (d) a plurality of three terminal semiconductor means each having a control terminal and each for controlling the energization and deenergization of a different one of said lamp loads by properly biasing its control terminal with respect to another terminal of the same three terminal semiconductor means;
   (e) a plurality of D.C. circuits connected in shunt with said first resistor and each having a capacitor connected between the said three terminal semiconductor switching means and the control terminal and a resistor in series with the capacitor between the control terminal and one terminal of the D.C. source of potential; and
   (f) means for supplying the proper biasing to switch the three terminal semiconductor switching means in repetitive cycles between the two operating states so as to cause the bias to change on the control terminal of each three terminal semiconductor means in a manner which causes the lights to be flashed sequentially.

4. The electronic circuit of claim 3 including an astable multivibrator which has as two of its active elements the three terminal semiconductor switching means and the first resistor and includes the means for supplying the proper biasing to the control terminal of each of said three terminal semiconductor switching means.

5. An electronic circuit which will sequentially energize a plurality of lamp loads and which comprises:

(a) an astable multivibrator having two three terminal semiconductor switching means which are alternately rendered conductive and nonconductive in repetitive cycles as the multivibrator vibrates;

(b) means responsive to the first of said three terminal semiconductor energizing means for flashing at least two of said lamp loads in sequence when said first of said three terminal semiconductor switching means is rendered conductive; and (c) means responsive to the second of said three terminal semiconductor switching means for energizing a third one of the lamp loads when the second of said semiconductor switching means is rendered conductive, and (d) circuit means for maintaining said two lamps energized until said third lamp load is also energized and for deenergizing all said lamp loads simultaneously.

6. An electronic circuit which will sequentially energize a plurality of lamp loads and which comprises:

(a) a three terminal semiconductor switching means which can be switched into either of two operating states by the proper biasing of one of the terminals with respect to one of the other terminals;

(b) means for supplying the proper biasing to switch the three terminal semiconductor switching means in repetitive cycles between the two operating states; and (c) a lag circuit means coupled to each lamp load for energizing each lamp load once in sequential order starting with the switching of the semiconductor switching means into one of its operating states whereby said lamp loads are energized at different times and deenergized at the same time.

References Cited by the Examiner

UNITED STATES PATENTS

| | | | |
|---|---|---|---|
| 2,916,670 | 12/1959 | Pederson | 315—209 |
| 2,960,627 | 11/1960 | Hunt | 315—322 |
| 3,019,393 | 1/1962 | Rockafellow | 315—322 X |
| 3,034,017 | 5/1962 | Larsen et al. | 340—331 X |
| 3,113,241 | 12/1963 | Yonushka | 315—200 |
| 3,162,772 | 12/1964 | Smith | 307—88.5 |
| 3,225,343 | 12/1965 | Kratochvil | 315—129 |

OTHER REFERENCES

I.B.M. Technical Disclosure Bulletin, vol. 3, No. 6, November 1960, pp. 44–45.

JOHN W. HUCKERT, *Primary Examiner.*

A. M. LESNIAK, *Assistant Examiner.*